(12) United States Patent
Chang

(10) Patent No.: US 9,749,033 B2
(45) Date of Patent: Aug. 29, 2017

(54) SMART GROUND-TERMINAL ANTENNA FOR GEOSTATIONARY SATELLITES IN SLIGHTLY INCLINED ORBITS

(71) Applicant: SPATIAL DIGITAL SYSTEMS, INC., Camarillo, CA (US)

(72) Inventor: Donald C. D. Chang, Thousand Oaks, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 301 days.

(21) Appl. No.: 14/445,058

(22) Filed: Jul. 29, 2014

(65) Prior Publication Data

US 2014/0334580 A1    Nov. 13, 2014

Related U.S. Application Data

(63) Continuation of application No. 13/772,382, filed on Feb. 21, 2013, now Pat. No. 9,287,961, which is a continuation of application No. 13/024,244, filed on Feb. 9, 2011, now Pat. No. 8,395,546.

(51) Int. Cl.

| | |
|---|---|
| *H01Q 3/02* | (2006.01) |
| *H04B 7/08* | (2006.01) |
| *H01Q 3/26* | (2006.01) |
| *H01Q 3/46* | (2006.01) |
| *H01Q 3/24* | (2006.01) |
| *H04B 7/06* | (2006.01) |

(52) U.S. Cl.
CPC ............ *H04B 7/086* (2013.01); *H01Q 3/24* (2013.01); *H01Q 3/2605* (2013.01); *H01Q 3/2647* (2013.01); *H01Q 3/46* (2013.01); *H04B 7/0615* (2013.01)

(58) Field of Classification Search
CPC .. H01Q 3/02; H01Q 3/12; H01Q 3/24; H01Q 3/46; H01Q 3/2605; H01Q 3/2647; H04B 7/086; H04B 7/0615
USPC ........................................................ 342/374
See application file for complete search history.

(56) References Cited

U.S. PATENT DOCUMENTS

| | | | |
|---|---|---|---|
| 3,340,530 A | 9/1967 | Sullivan et al. | |
| 6,166,689 A * | 12/2000 | Dickey, Jr. | ............. G01S 3/043 342/371 |
| 6,266,528 B1 | 7/2001 | Farzaneh | |
| 6,823,170 B1 | 11/2004 | Dent | |

(Continued)

*Primary Examiner* — Harry Liu

(57) ABSTRACT

A receive only smart antenna with a command pointing option for communicating with geostationary satellites that autonomously detects the directions from which desired signal are received, and steer the multiple beams accordingly. An array feed is used to illuminate a parabolic reflector. Each feed element of the receive only smart antenna is associated with a unique beam pointing direction. As a receiver is switched to different feed elements, the far-field beam is scanned, making it possible to track a geostationary satellite in a slightly inclined orbit. This eliminates the need for mechanical tracking and maintains high antenna gain in the direction of the geostationary satellite. The receive only smart antenna also features capabilities to form multiple simultaneous beams supporting operations of multiple geo-satellites in closely spaced slightly inclined orbits. The designs can support orthogonal beams for enhanced bandwidth capacity via multiple beams with excellent spatial isolation.

20 Claims, 12 Drawing Sheets

(56) References Cited

U.S. PATENT DOCUMENTS

| | | |
|---|---|---|
| 7,786,933 B2 | 8/2010 | Chang |
| 7,834,807 B2 | 11/2010 | Chang |
| 8,035,562 B2 | 10/2011 | Chang |
| 8,098,612 B2 | 1/2012 | Chang |
| 8,107,569 B2 | 1/2012 | Chang |
| 8,111,646 B1 | 2/2012 | Chang |
| 8,537,922 B2* | 9/2013 | Wang .................. H04B 7/0417 375/267 |
| 2002/0081969 A1* | 6/2002 | Chang .................. H01Q 1/007 455/13.1 |
| 2002/0169578 A1* | 11/2002 | Yang ........................ G01S 3/36 702/152 |
| 2005/0260947 A1* | 11/2005 | Karabinis ............ H04B 7/0408 455/12.1 |
| 2007/0008066 A1 | 1/2007 | Fukuda |
| 2008/0291864 A1* | 11/2008 | Chang .................. H04B 7/2041 370/316 |
| 2011/0032143 A1 | 2/2011 | Sun |
| 2011/0122961 A1* | 5/2011 | Sang .................... H04B 7/0434 375/267 |
| 2012/0026054 A1 | 2/2012 | Chang |
| 2012/0028572 A1 | 2/2012 | Chang et al. |
| 2012/0062404 A1 | 3/2012 | Lin |
| 2012/0063550 A1 | 3/2012 | Chang |

* cited by examiner

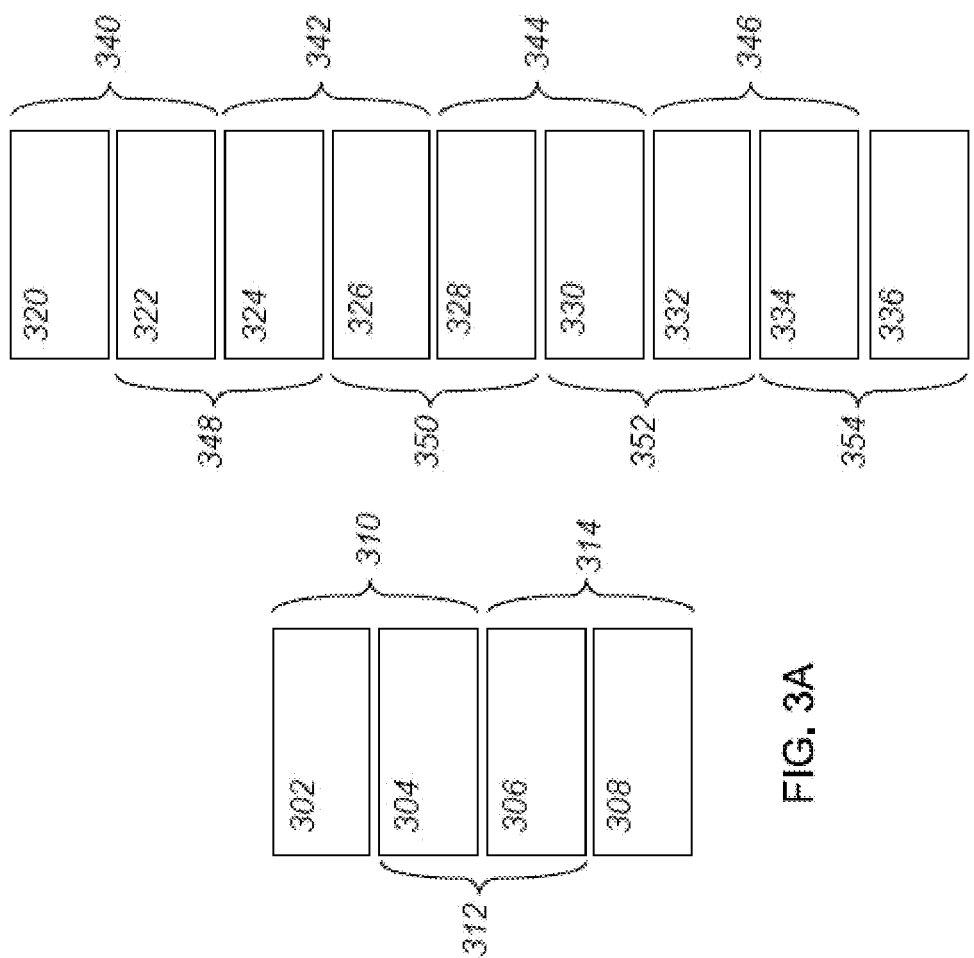

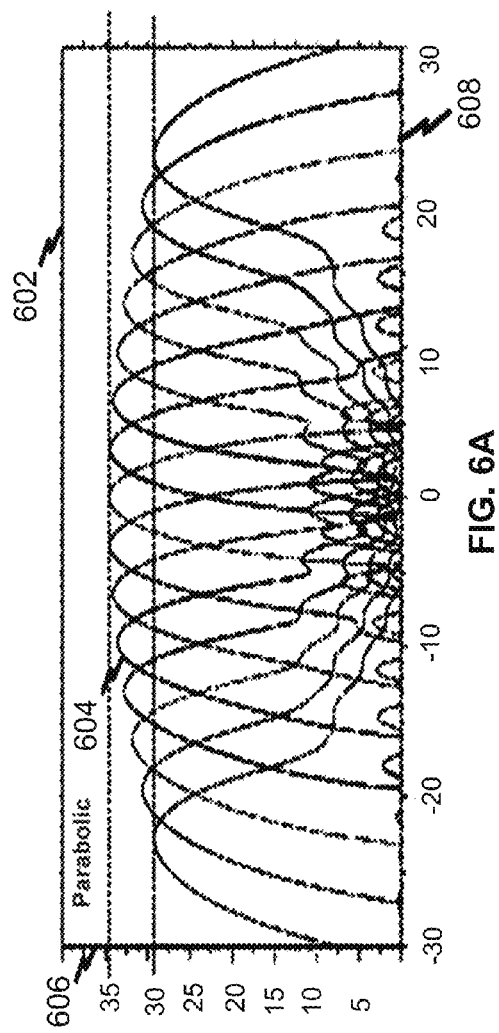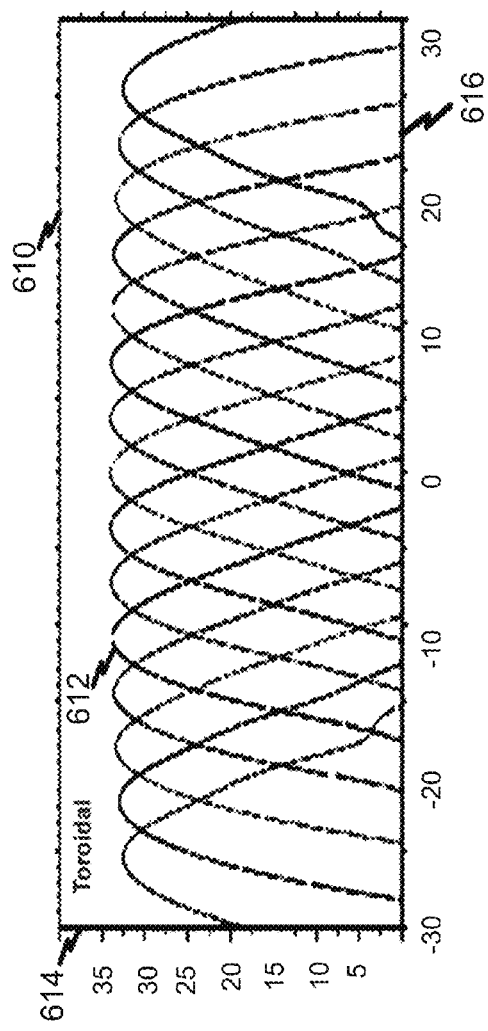

SMART GROUND-TERMINAL ANTENNA FOR GEOSTATIONARY SATELLITES IN SLIGHTLY INCLINED ORBITS

This application is a continuation of application Ser. No. 13/772,382, filed Feb. 21, 2013, now pending, which is continuation of application Ser. No. 13/024,244, filed on Feb. 9, 2011, now U.S. Pat. No. 8,395,546.

BACKGROUND OF THE INVENTION

1. Field of the Invention

The present invention relates to ground-terminal antennas for communicating with satellites in geostationary orbit. More particularly, it relates to low-cost, electronically steerable antennas adapted to compensate for motion of a satellite with respect to its fiducial geostationary position, and to electronically steerable multi-beam antennas adapted to compensate for motions of multiple satellites simultaneously.

2. Description of Related Art

Satellites in geostationary orbit are widely used for communications and broadcast applications. When the orbit of a satellite lies along a path 35,786 km directly over the equator, its orbital velocity exactly matches the rate of rotation of the Earth, and the satellite remains fixed in the sky relative to an observer on the ground. This greatly simplifies the design of ground terminals because they can be designed to point in a single fixed direction and do not require bulky motorized gimbals or tracking hardware. However, while a satellite in geostationary orbit should theoretically remain at a fixed location in the sky, perturbations to its orbit caused by interactions of the Sun and Moon as well as the non-spherical shape of the Earth itself cause the orbit of the satellite to drift away from its fiducial geostationary point. As shown in FIG. 1A, 1B, 1C, a satellite that drifts into a slightly inclined orbit with respect to the equator begins to trace out an elongated figure-eight pattern oriented in the north-south direction in the sky, as seen by the observer on the ground. This motion can result in severe loss of signal by a ground terminal with a simple fixed antenna. A number of methods to address this problem have been developed, but all have significant drawbacks.

One method of addressing this problem is to articulate the ground terminal by adding gimbals and a mechanical tracking system to allow the antenna pointing to be continually adjusted in order to track the satellite. However, such a solution adds significant cost, bulk, and complexity and is not suitable for applications requiring a large number of ground stations, such as direct-broadcast television.

Another method is to selectively broaden the antenna pattern in the north-south direction to account for the increased satellite motion in this direction. For example, a typical one-meter-diameter parabolic antenna operating at Ku band will exhibit a beam width of approximately two degrees. If the antenna reflector is compressed into an ellipse, the pattern in the north-south direction can be stretched to twelve-to-fourteen degrees, covering excursions of a satellite in an orbit inclined up to six or seven degrees with respect to the equator. However, stretching the radiation pattern significantly reduces antenna gain, negatively impacting receive performance and requiring additional power for transmit.

Another method is to actively control the position of the satellite by firing thrusters to perform "station-keeping" maneuvers in order to keep the satellite as close as possible to the equator to minimize north-south excursions. The tighter the station-keeping requirements imposed by the capabilities of the ground terminals, the more frequent are the required station-keeping maneuvers. When the satellite runs out of fuel, it can no longer be maintained in geostationary orbit, so the frequency of such maneuvers directly affects the useful life of the satellite.

Thus, it would be useful to provide a design for a low-cost, compact, ground terminal that does not require mechanical tracking and that would enable a relaxation of tight station-keeping requirements for geostationary satellites in order to reduce fuel consumption and prolong their useful lifetimes.

In addition, it would be useful to provide broader bandwidth and higher data rate to subscribers via a ground terminal design with multiple beams that do not require mechanical tracking and that would enable multiple satellites in slightly inclined orbits concurrently operating in the same spectrum covering the same serve areas with no interference among them.

SUMMARY OF THE INVENTION

A system is provided that autonomously detects a direction of arrival of signals from a geostationary satellite via diagnostic beams and generates both receiving (Rx) and transmitting (Tx) beams for main signals. The Rx system maintains high gain in the direction of the satellite while it transmit signals are sent along the same direction back to the satellite. The ground terminal continuously tracks the satellite motion without the need for a mechanical pointing system.

An embodiment of a retro-directive antenna terminal in accordance with the present invention includes a parabolic reflector with an array feed positioned near its focus. The array feed includes N feed elements, where N is an integer greater than or equal to two. An embodiment described herein has N equal to four, providing a compromise between the complexity of the array feed and the pointing resolution of the antenna beam. However, an array feed comprising as few as two elements or more than four elements would also fall within the scope and spirit of the present invention.

A parabolic reflector typically has a limited scan range, and far-field beams arriving from directions that are a few degrees off of boresight will focus at locations that are slightly offset from the boresight focus of the antenna. Thus, energy arriving from off-boresight angles will preferentially illuminate elements of the array feed that are positioned slightly away from the reflector focus. Similarly, energy radiated from feed array elements that are located slightly off focus will result in far-field beams that are pointed in directions a few degrees off of boresight. Thus, for a fixed boresight direction, an array feed allows for electronic scanning of the antenna beam within the limited scan range of the parabolic reflector. In the case of geostationary satellites that are inclined by a few degrees from the equator and thus move in a north-south direction relative to the ground terminal during the course of each day, a feed array oriented in the north-south, or elevation direction will allow the motion of the satellite to be tracked without mechanically moving the boresight pointing direction.

An enhanced scan range in the azimuth direction can be achieved with an antenna reflector having a circular profile. Thus, a parabolic toroidal reflector having a parabolic profile in elevation and a circular profile in azimuth will exhibit a moderate scan range in elevation, as described above, combined with a wider scan range in azimuth. Such an antenna, equipped with an appropriate feed array, would be able to simultaneously track multiple geostationary satellites separated in azimuth by over ten beamwidths.

In order to maximize a reflector antenna gain for a beam position, its associated optimal feed dimensions for a beam in far field may be obtained by balancing the spill-over loss and the aperture efficiency. In the proposed applications in which continuous beam scanning is desired, multiple contiguous elements will be utilized to function as a single feed for optimized gain performance while supporting fine pointing granularity with minimized cross-over loss. More than two elements will be used for gain optimization of a beam position. Beam scanning are achieved through the following two configurations;

1. through switching matrix (and combiners) to achieve "switching" a set of feed elements pointing to one beam position, to another set of feed elements pointing to an adjacent beam position;
    a. majority of elements in the two sets are identical ones
    b. there may only be one or two elements are replaced
2. through progressive phasing in a second (processing) domain to achieve "switching" a set of feed elements pointing to one beam position, to another set of feed elements pointing to an adjacent beam position;
    a. converting the antenna configuration from multiple beam antenna to a "phased array" equivalent through Fourier Transforming the Rx signals from the array of feeds
    b. By properly amplitude and phase weighting on the transformed signals, the contributing feed elements are switched from one set to the second set.

In an embodiment of an antenna terminal in accordance with the present invention, signals arriving at the N array feed elements are individually amplified by low-noise amplifiers (LNAs) and divided into two paths: a main receive (Rx) path and a diagnostic path. The signals in the diagnostic path are applied to the inputs of an N-by-N Butler Matrix (BM) or other device configured to perform a spatial Fourier transform (FT) of the array feed signals. We are using configuration (1) for main beams and configuration (2) for diagnostic beams.

Various inputs of the BM generate different phase progressions among the N outputs. The outputs of the Butler Matrix are then frequency down-converted to form N baseband signals that are each digitized by analog-to-digital converters. A direction-of-arrival processor then measures the phase slope of the digitized signals to determine the direction of the wavefront incident on the feed array elements and thus, the direction of arrival of the signal from the satellite. This information also enables the system to determine which of the feed array elements is being illuminated by the signal arriving from the satellite.

In the main receive path, the outputs of the LNAs are routed to a switch matrix that is switched to select the illuminated feed array element as the primary receive signal of the system. This signal may be frequency down-converted and sent to the primary receiver of the system, which might be a digital television receiver or other communications device. For designs that may feature two or elements being highly illuminated, these elements will be combined properly in the switch matrix to function as a single feed.

A digital beam forming (DBF) processor uses the measured phase slope information to calculate receive beam weight vectors (BWVs), which are sets of complex coefficients that can be used to adjust the amplitude and phase of the signals from the elements of an array in order to create coherent beams pointing in selected directions. The receive BWVs operate to index to proper transmit BWVs that are used to create a transmit beam that will be directed back along the direction of the receive beam. Note that the correlation index of the receive (Rx) and transmit BWVs is generated off line and beforehand as a look-up table to assure that the transmit and receive beams are always directed to and from the same feed element and thus pointed in the same direction.

Digital waveforms comprising the desired transmit signals to be sent to the satellite are multiplied by the BWVs calculated by the DBF processor in order to create a set of N digital signals that exhibit a phase slope that is conjugate to that of the received signals. These N digital signals are then routed through N digital-to-analog converters to synthesize N analog baseband waveforms containing the transmit data and exhibiting the proper conjugate phase slope. The N analog baseband waveforms are then frequency up-converted to N radio-frequency signals. These radio-frequency signals are amplified by solid-state power amplifiers or other radio-frequency amplifiers known in the art and are applied to a transmit-side Butler Matrix, or other device capable of performing a spatial FT. The outputs of the transmit-side Butler matrix are then applied to the feed array elements through diplexers, producing a transmit beam that is directed back along the line of sight to the satellite.

In general, the receive beam can be thought of as being focused by the parabolic reflector onto one of the elements of the array feed. The spatial FT then produces a set of signals encoding a phase slope that is indicative of the direction of the wavefront causing illumination of that array element. By encoding the conjugate of that phase slope into the transmit signal and running it through a transmit-side FT, the transmit energy appears preferentially at only one of the elements of the feed array. This then produces a beam that is retro-directed back along the same line of sight as the received beam. Of course, it is also possible that the received beam will illuminate two of the elements of the feed array, indicating an arrival angle between those that would illuminate a single element. This would simply result in the transmit signal's also being applied to the same two array feed elements to produce a retro-reflected beam. It is conceivable to design a received beam illuminating more than two elements of the feed array, indicating an arrival angle among those that would illuminate a single undersized element of the feed array. A properly designed combining network is required to aggregate the received signals from these illuminated elements functioning as a single receive element. This would simply result in the transmit signal's also being applied to the same array feed elements with proper weighting in combining them to produce a retro-reflected beam.

Thus in the preferred embodiment, the beam formation is performed in a "wavefront domain." The conversions to and from the beam domain take place in two spatial FT devices (the BMs). The phase progressions in the wavefront domain uniquely identify discrete signal directions associated with individual antenna feed elements. The reflector having multiple feeds is characterized as a multi-beam antenna (MBA), and each of the feed elements corresponds to a unique beam position in the far field. For a reflector with N feed elements, there are N distinct far-field beam positions with associated beam widths. After processing by the spatial FT device, each of the N output ports receives signals from all of the N array feed elements simultaneously. The N output ports share the same field of view but have unique phase slopes associated with the directions of arrival, similar to the characteristics of an array antenna.

It is also possible to implement retro-directive antennas in the "beam domain" without the use of spatial FT devices. As compared to the wavefront-domain implementation described above that features graceful degradation in the transmit beam having N power amplifiers driving a spatial FT processor, the beam-domain implementation would feature a one-to-N switch matrix with a single large power amplifier at the input side.

In an alternative embodiment of a retro-directed antenna terminal in accordance with the present invention, orthogonal coding is used to simplify the radio-frequency hardware and to eliminate the need for multiple down- and up-conversion stages and multiple A/D and D/A converters. In this alternative embodiment, the received signals from four array feed elements are routed through a Butler Matrix or other radio-frequency FT processor. The four transformed outputs are then routed to four bi-phase modulators, each of which is driven by a separate mutually orthogonal pseudonoise (PN) code produced by a code generator. The four modulated beams are then summed, and the composite beam is frequency down-converted by a single down-converter and digitized by a single A/D converter. The sampled composite beam is then routed through four matched filters, each of which correlates the sample stream with one of the PN sequences. Because of the mutual orthogonality of the PN sequences, only that portion of the composite beam that was originally modulated with the corresponding PN sequence will be recovered by the matched filter. Thus, this process allows for the recovery of four separate digital data streams while requiring only one down-conversion chain and one A/D. This not only reduces RF parts count and complexity but also eliminates problems of poorly matched analog channels that can degrade performance.

The digital samples are processed by a direction-of-arrival processor as before, and a DBF processor again calculates BWVs corresponding to the measured phase slope and direction of arrival. In addition to using the BWVs to perform transmit-side beam forming, the BWVs are also used to multiply the receive data streams coming out of the matched filters. This operation recovers the coherent sum of the feed array elements for the direction of arrival of the wavefront from the satellite and thus is a fully digitized primary receiver signal that can be routed to the primary receiver of the system, such as a digital television receiver or similar device. Thus, the need for a separate analog switch matrix and separate down-conversion chain is also eliminated.

On the transmit side, the primary digital transmit waveform is multiplied by the complex BWVs to create a phase profile that is conjugate to that of the receive side. The composite digital signal is then routed to a single D/A converter that synthesizes an analog transmit waveform encoded with the desired phase profile. This analog waveform is then frequency up-converted to radio frequency. The up-converted RF signal is then applied to four bi-phase modulators driven by the same mutually orthogonal PN codes in order to create four separate modulated RF signals. These signals are then amplified by solid-state power amplifiers or other RF amplification devices and are applied to the four inputs of a transmit-side Butler Matrix or other RF FT processor. The constructive and destructive combinations that are formed inside the Butler Matrix then result in the output's being directed to the same feed element or elements of the array feed that were illuminated by the receive signal from the satellite.

The foregoing discussion described an embodiment of a retro-directive antenna terminal having a four-element feed array. However, other numbers of feed elements in the antenna feed array are possible with corresponding adjustments to the number of inputs to the receive-side and transmit-side Butler Matrices and other channel-specific hardware. Such systems would also fall within the scope and spirit of the present invention.

From the foregoing discussion, it is clear that certain advantages have been achieved for a retro-directive antenna terminal that autonomously detects a direction of arrival of a satellite signal and transmits back along the same direction. Further advantages and applications of the invention will become clear to those skilled in the art by examination of the following detailed description of the preferred embodiment. Reference will be made to the attached sheets of drawing that will first be described briefly.

From the foregoing discussion, it is clear that certain advantages have been achieved for a retro-directive antenna terminal that autonomously detects a direction of arrival of a satellite signal and transmits back along the same direction. It is also clear that 1. Rx only smart antennas featuring the same configurations using diagnostic beams for detections of arrival directions of desired signals to guide the pointing directions of the main beam.
2. Rx only smart antennas featuring multiple orthogonal beams with the same configurations using diagnostic beams for detections of arrival directions of desired and undesired signals to guide the peak pointing and null-steering directions of the orthogonal beams concurrently.
    a. A satellite ground terminal with orthogonal beams (OB) exhibits the concurrent multiple beam; each beam pointing its peak gain to a designated satellite while steering its nulls to the peaks of all other OBs which are pointed respectively to other satellites near by.

Further advantages and applications of the invention will become clear to those skilled in the art by examination of the following detailed description of the preferred embodiment. Reference will be made to the attached sheets of drawing that will first be described briefly.

BRIEF DESCRIPTION OF THE DRAWINGS

FIGS. 3A and 3B are schematic diagrams illustrating grouping of antenna feed elements to achieve finer pointing resolution;

FIGS. 6A and 6B depict the azimuthal scanning capability of a parabolic and a parabolic-toroidal antenna reflector in accordance with the present invention.

DETAILED DESCRIPTION OF THE PREFERRED EMBODIMENT

The invention provides a simple, low-cost, limited-scan-angle, retro-directive antenna featuring an array feed capable of steering the antenna pattern to track orbital excursions of a geostationary satellite in an orbit inclined with respect to the equator by several degrees. In the detailed description that follows, like element numerals are used to indicate like elements appearing in one or more of the figures.

Figure 1C:
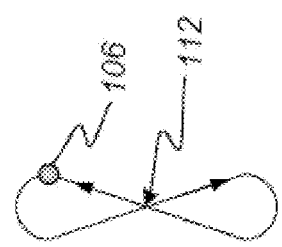
FIG. 1C depicts the orbital motion as viewed from directly below an object in geostationary orbit
Figure 1A:
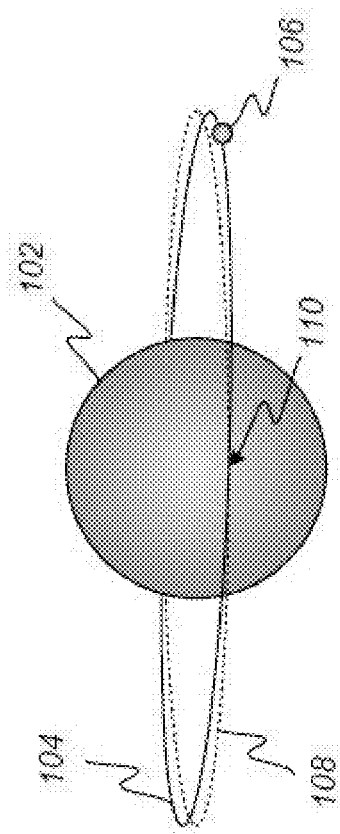
FIGS. 1A and 1B depict the orbital motion of a typical geostationary orbit around the Earth
Figure 1B:
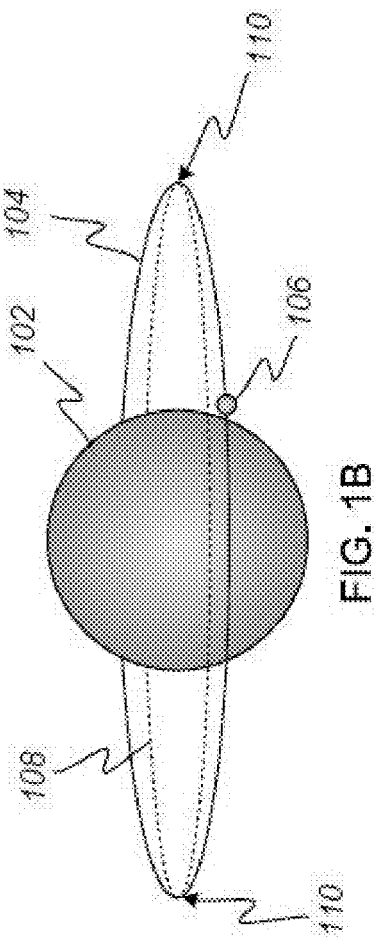

FIGS. 1A, 1B, and 1C depict the motion of a typical geostationary satellite 106 in orbit around the Earth 102. The ideal geostationary orbit 108 lies directly above the Earth's equator and results in the satellite's appearing stationary in the sky with respect to an observer on the ground. Due to gravitational perturbations, the actual orbit 104 of the satellite drifts, becoming inclined by up to several degrees with respect to the equator. Periodic station-keeping maneuvers are undertaken to bring the actual orbit back toward an inclination of zero degrees. The inclined orbit 104 crosses the equatorial plane at nodes 110. FIG. 1A depicts the orbit from a direction along a line connecting the two nodes 110. FIG. 1B depicts the orbit from a direction perpendicular to a line connecting the two nodes 110.

FIG. 1C depicts the apparent motion of the satellite 106 as viewed from the ground during the course of one day. The satellite 106 traces out a figure eight in a north-south direction, appearing at location 112 as it passes the orbital nodes 110. The height of the figure eight depends on the inclination of the orbit 104 with respect to the equator. The majority of the satellite displacement is in the elevation direction; the magnitude of the displacement in azimuth is generally an order of magnitude smaller.

Figure 2A:
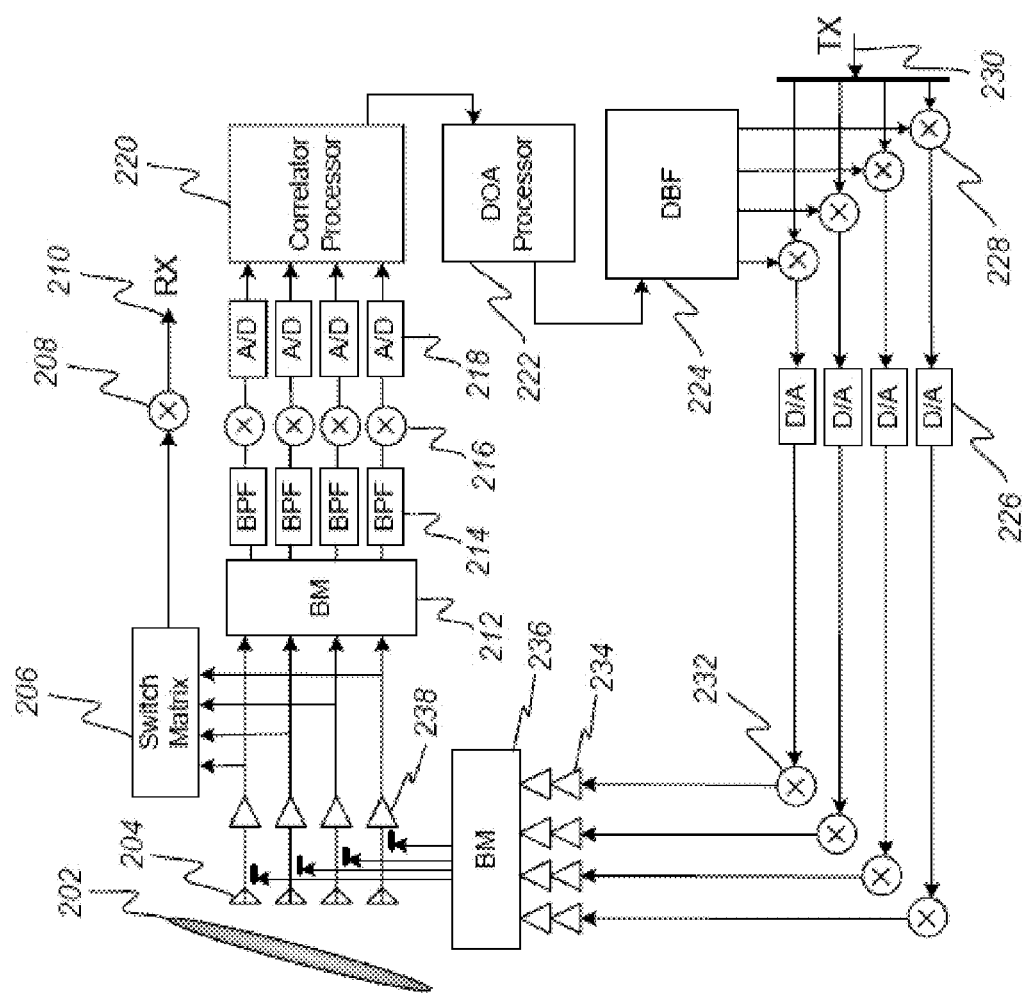
FIG. 2A illustrates a block diagram of an embodiment of a multiple-beam retro-directive ground terminal in accordance with the present invention.

FIG. 2A depicts a block diagram of an embodiment of a ground terminal in accordance with the present invention. The terminal includes a parabolic reflector 202 that is illuminated by four feeds 204, which may be horns, patches, or any other types of antenna feeds known in the art. The feeds are oriented to have the optimal polarization response individually, and they are positioned linearly in the focal plane along a line parallel to the local elevation direction. The scan range of a typical parabolic reflector is approximately +/−5 beamwidths. For a one-meter reflector at Ku band, the beamwidth is approximately two degrees, and the scan capability is approximately +/−10 degrees. Signals arriving from directions within this scan range will be focused at slightly varying locations. Conversely, feeding the antenna from locations that vary slightly will result in antenna beams that point in slightly different directions within the scan range of the reflector. Thus, feeding the antenna from different elements or combinations of different elements of the feed array will result in beam steering in the far field. Although FIG. 2A depicts a system having four feeds, other systems are possible that include N feeds, where N is an integer greater than or equal to two, and such systems would also fall within the scope and spirit of the present invention.

Satellite signals impinging on the reflector 202 are focused onto the feeds 204, are amplified by low-noise amplifiers 138, and are routed to a four-by-four Butler Matrix (BM) 212. The four-by-four BM includes four 90-degree hybrids and two fixed phase shifters configured in a manner well known in the art to produce an output that is a spatial Fourier transform (FT) of the input. The BM converts the beam-space signals from the feed elements to wavefront-domain signals. The four output wavefront signals from the BM are orthogonal to one another. Of course, for systems including N feed elements, correspondingly sized N-by-N BMs would be used. The outputs of the BM 212 are then routed through band-pass filters 214 and then to frequency down-converters 216 that convert the radio-frequency inputs to an intermediate or baseband frequency. The frequency-down-converted signals are then digitized using analog-to-digital converters 218, and the digital samples are passed to a correlation processor 220. The correlation processor compares the digitized samples from each of the BM outputs and calculates a phase slope across the outputs. The direction-of-arrival (DOA) processor 222 uses this phase slope to determine which of the antenna feeds within the feed array is being illuminated by the signal from the parabolic or parabolic-toroidal dish 202. This information is then used in the main receive signal path to select the appropriate states of switches in the switch matrix 206 in order to route the received signal from a selected feed to the primary frequency down-converter 208 in order to prepare the intermediate-frequency receive signal 210 that is routed to the main receiver (not shown). Methods of forming a spatial FT of the input other than using a Butler Matrix in the diagnostic path may also be used and would fall within the scope and spirit of the present invention.

The direction-of-arrival information is also used by a digital beam forming (DBF) processor 224 to calculate an appropriate set of beam weight vectors (BWVs) that can be applied to the main transmit signal 230 in order to select a phase slope that is conjugate to that of the received signal. When this phase slope is applied 228 to the transmitted beam, it results in retro-directed transmit beam that propagates back along the direction from which the received beam arrives. The main digital transmit signal is multiplied 228 with the BWVs generated by the DBF processor 224, and the composite waveform is synthesized using digital-to-analog converters 226. The synthesized baseband waveform is then frequency up-converted 232 and amplified 234 and applied to a transmit-side Butler Matrix 236. The outputs of the transmit-side BM are then applied through diplexers to the antenna feeds 204 which illuminate the reflector 202 and produce a retro-directed far-field beam. Note that the proper selection of the BWVs applied to the transmit signal 230 by the DBF processor 224 results in constructive and destructive combining through the transmit BM 236 to result in a non-zero output at only one of the antenna feed elements 204—the same one upon which the receive signal is incident. In other words, the selection of a set of BWVs at digital baseband performs a switching function, directing RF energy to the selected antenna feed element.

Figure 2B:
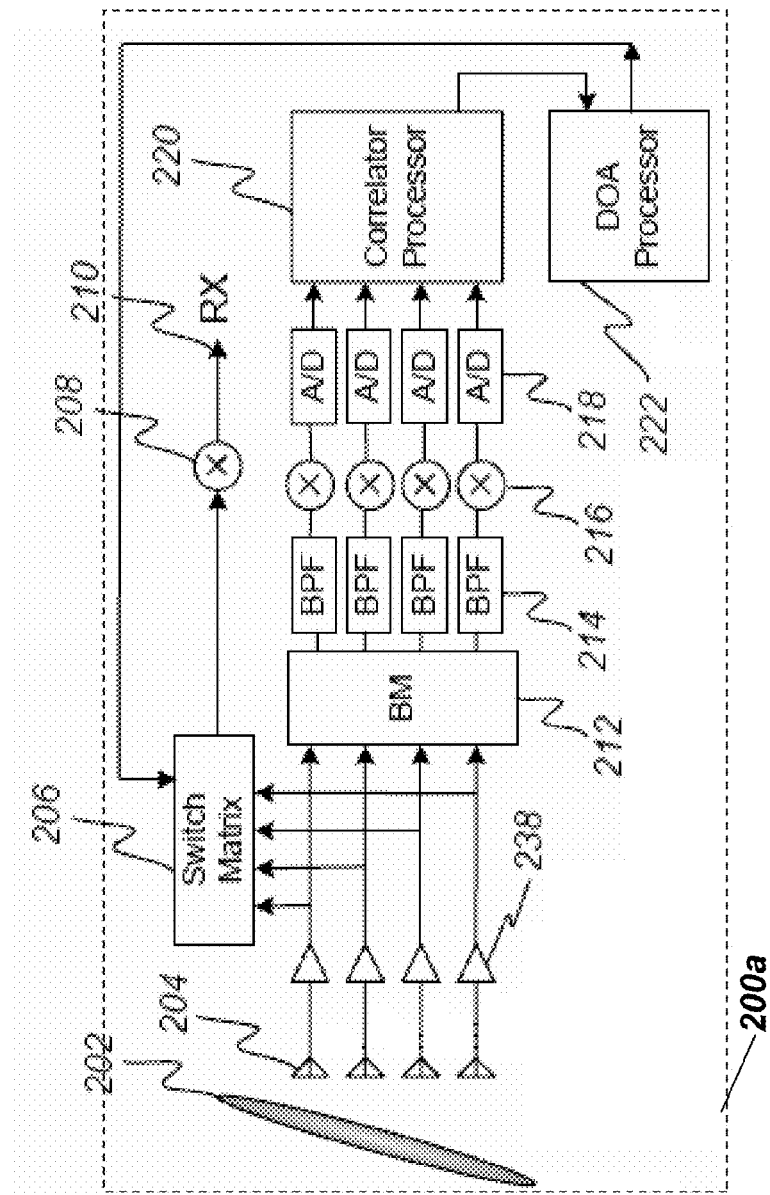
FIG. 2B illustrates a block diagram of an embodiment of an Rx only smart ground terminal in accordance with the present invention.

FIG. 2B depicts the same block diagram of the Rx portion of the embodiment of a ground terminal in FIG. 2A in accordance with the present invention. Satellite signals impinging on the reflector 202 are focused onto the feeds 204, are amplified by low-noise amplifiers 138, and divided by two separated paths; one for main beam beam-forming and the other for diagnostic. The signals for diagnostic are routed to a four-by-four Butler Matrix (BM) 212. The four-by-four BM produces an output that is a spatial Fourier transform (FT) of the input converting the beam-space signals from the feed elements to wavefront-domain signals. The four output wavefront signals from the BM are orthogonal to one another. Of course, for systems including N feed elements, correspondingly sized N-by-N BMs would be used.

The outputs of the BM 212 are then routed through band-pass filters 214 and then to frequency down-converters 216 that convert the radio-frequency inputs to an intermediate or baseband frequency. The frequency-down-converted signals are then digitized using analog-to-digital converters 218, and the digital samples are passed to a correlation processor 220.

The correlation processor compares the digitized samples from each of the BM outputs and calculates a phase slope across the outputs. The direction-of-arrival (DOA) processor 222 uses this phase slope to determine which of the antenna feeds within the feed array is being illuminated by the signal from the parabolic or parabolic-toroidal dish 202. This information is then used in the main receive signal path to select the appropriate states of switches in the switch matrix 206 in order to route the received signal from a selected feed to the primary frequency down-converter 208 in order to prepare the intermediate-frequency receive signal 210 that is routed to the main receiver (not shown).

Figure 2C:
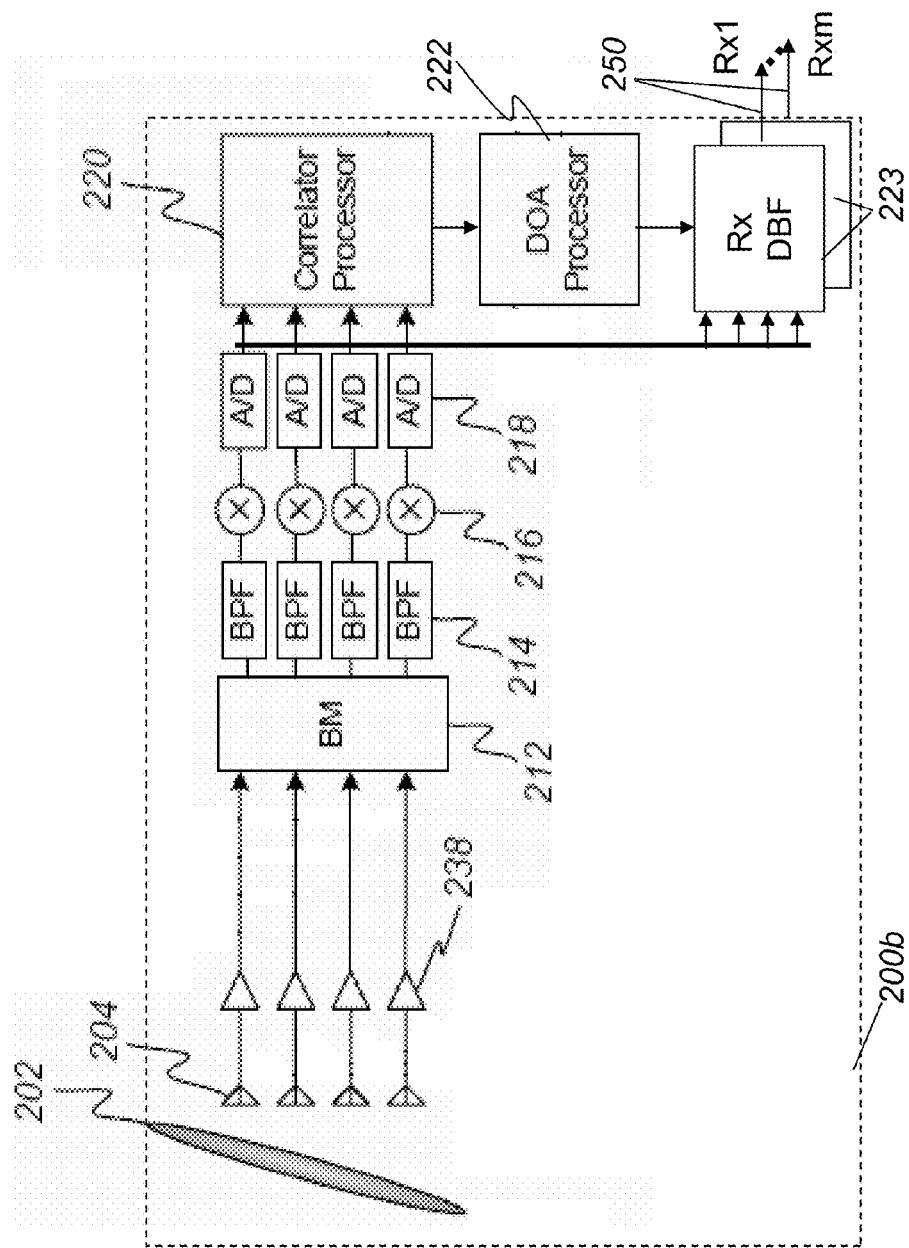
FIG. 2C illustrates a block diagram of an embodiment of a multiple-beam Rx only smart ground terminal in accordance with the present invention.

FIG. 2C depicts the same block diagram of a portion of the embodiment of a ground terminal in FIG. 2B in accordance with the present invention. Both main signals and diagnostic processing are performed in wavefront domains.

Satellite signals impinging on the reflector 202 are focused onto the feeds 204, are amplified by low-noise amplifiers 138, and are routed to a four-by-four Butler Matrix (BM) 212. The four-by-four BM produces an output that is a spatial Fourier transform (FT) of the input converting the beam-space signals from the feed elements to wavefront-domain signals. The four output wavefront signals from the BM are orthogonal to one another. Systems with N feed elements feature N-by-N BMs.

The outputs of the BM 212 are then routed through band-pass filters 214 and then to frequency down-converters 216 that convert the radio-frequency inputs to an intermediate or baseband frequency. The frequency-down-converted signals are then digitized using analog-to-digital converters 218, and the digital samples are passed to a correlation processor 220.

The correlation processor generates cross-correlations among the digitized samples from the BM outputs and calculates a phase slope across the outputs for each of the desired signal sources. The direction-of-arrival (DOA) processor 222 uses these phase slopes comparing with pre-calibrated phase distributions of various beam positions, which are captured as different beam weight vectors (BWVs) for the parabolic or parabolic-toroidal dish 202 and specified feed configurations 204.

A selected BWV is then used in the Rx DBF 223 to generate a main receive signal. Multiple Rx DBF processing will utilize various BWVs independently generating different beams concurrently.

Figure 2D:
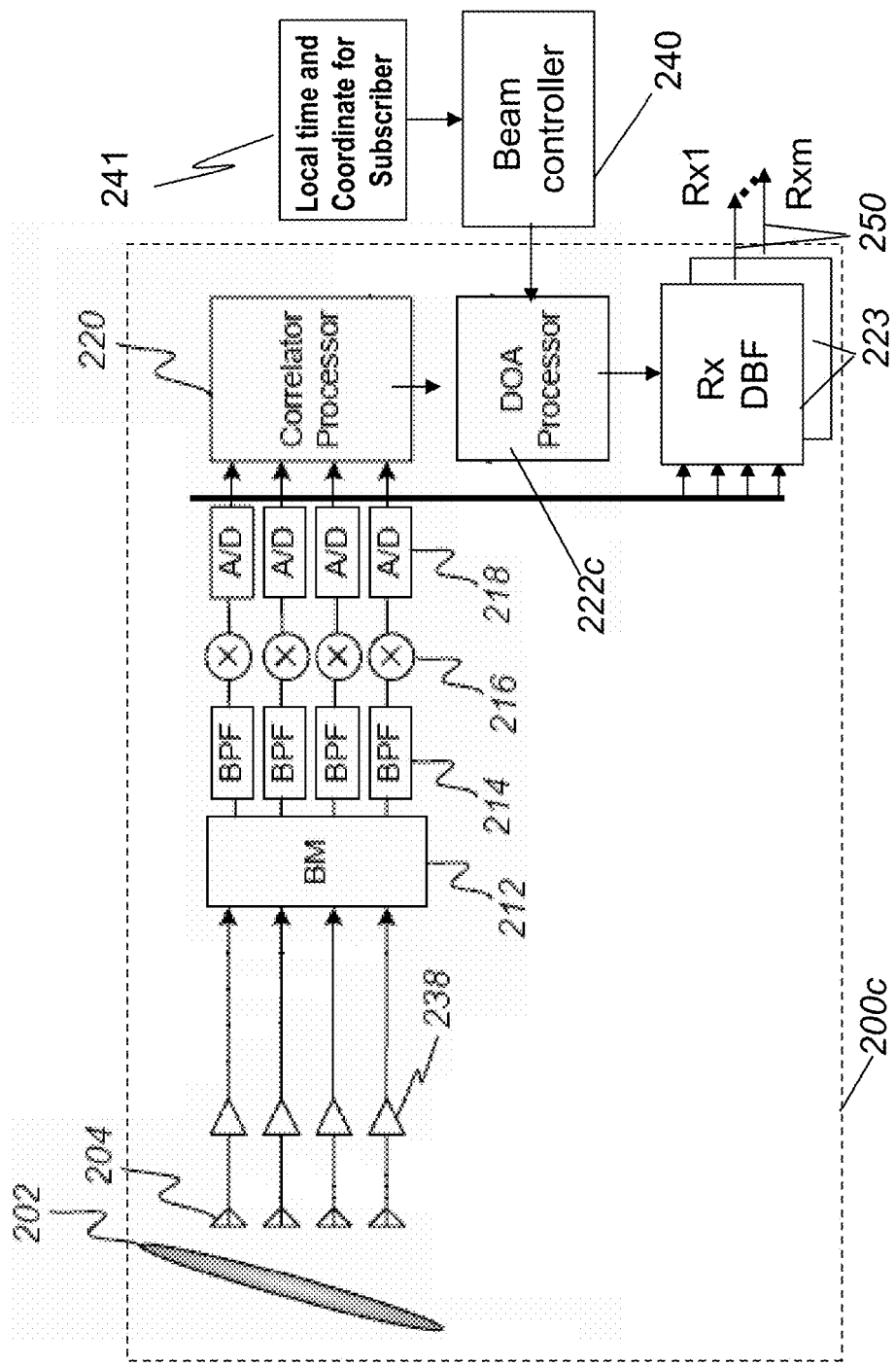
FIG. 2D illustrates a block diagram of an embodiment of an Rx only smart ground terminal with a command pointing option in accordance with the present invention.

FIG. 2D depicts the same block diagram as the embodiment of a ground terminal in FIG. 2C in accordance with the present invention, except an external beam controller 240 is connected to the DOA process 222c.

Satellite signals impinging on the reflector 202 are focused onto the feeds 204, are amplified by low-noise amplifiers 138, and are routed to a four-by-four Butler Matrix (BM) 212. The four-by-four BM produces an output that is a spatial Fourier transform (FT) of the input converting the beam-space signals from the feed elements to wavefront-domain signals. The four output wavefront signals from the BM are orthogonal to one another. Systems with N feed elements feature N-by-N BMs.

The outputs of the BM 212 are then routed through band-pass filters 214 and then to frequency down-converters 216 that convert the radio-frequency inputs to an intermediate or baseband frequency. The frequency-down-converted signals are then digitized using analog-to-digital converters 218, and the digital samples are passed to multiple Rx DBF processors 223.

The correlation processor 220 with recorded cross-correlations among the digitized samples from the BM outputs provide data on unbalanced amplitudes and phase variations among the multiple elements; and effects of multi-paths; which are captured in a "vector modifier" during calibration processing. The vector modifier will be used to modify BWVs for various beam positions in the DOA processor.

On the other hand the external beam controller will continuously calculate the BWVs for various beam positions and associated null positions based on time of the day, and the coordinate of a subscriber. For slow moving satellites in slightly inclined orbits, the desired reception patterns from a subscriber terminal may need to be updated every few minutes. The direction-of-arrival (DOA) processor 222 will incorporate the BWVs from the external beam controller 240 and the vector modifier from the correlator processor 220 as modified BWV inputs to the dynamic data streams for new beam positions for various Rx DBF processors 223.

The 4 signals in digital format from the 4 A/Ds 218 are the other set of inputs to the Rx DBF processors. Outputs from a Rx DBF processor 223 are the dynamic signal stream from a Rx tracking beam pointed to a desired satellite with nulls at undesired satellites nearby. Multiple Rx DBF processing will utilize various BWVs independently generating different beams concurrently.

In the embodiment discussed above, scanning of the far-field beam may be performed in four discrete beam positions, each position corresponding to one of the four feed element locations. However, because a BM is a linear device, it is also possible to vary the signal intensity across multiple feed elements to provide finer scanning resolution. For example, FIGS. 3A and 3B depict possible groupings of adjacent antenna feed array elements that may be used to point the far-field beam in directions between those achieved by using a single feed element. FIG. 3A depicts an embodiment of a four-element array in accordance with the present invention. The antenna feed elements 302, 304, 306, and 308 may be driven one at a time in order to point the far-field beam in four slightly different directions. Alternatively, elements 302 and 304 can be driven together as indicated at 310 by applying linear combinations of BWVs to the digital baseband transmit signal that result in driving element 302 and element 304. The resulting far field beam will point in a direction between the beams formed when either element 302 or 304 is driven alone. Similarly, other adjacent combinations may be formed, such as those indicated at 312 and 314.

FIG. 3B depicts an alternative embodiment of a feed array in accordance with the present invention in which nine antenna feed array elements, 320-336, are used. Similarly, combinations of adjacent elements, e.g., 340, 348, may be used to provide finer resolution than driving individual elements alone would achieve. Systems using N array elements, where N is an integer greater than or equal to two, would also fall within the scope and spirit of the present invention.

Although the above discussion focused on the transmit-side application of the feed array, the concept of grouping adjacent elements to increase the pointing resolution is equally effective for the receive operation. Again, because the BM 212 is a linear device, a signal incident on the parabolic reflector 202 that illuminates more than one feed element, e.g., the combination 310, can be viewed as a linear combination of a signal that illuminates element 302 and one that illuminates element 304. From this linear combination, the DOA processor 222 is able to determine a direction of arrival that lies between those of each element taken individually.

The far-field radiation produced by the feed arrays depicted in FIGS. 3A and 3B are linearly polarized. However, the techniques described above are equally applicable to circularly polarized radiation. If a polarizing device, such as one implemented using meander-line techniques well known in the art, is placed in front of the feed array, transmitted linearly polarized radiation can be circularly polarized. Similarly, received circularly polarized radiation can be converted to linearly polarized radiation before being collected by the feed-array elements.

Figure 4A:
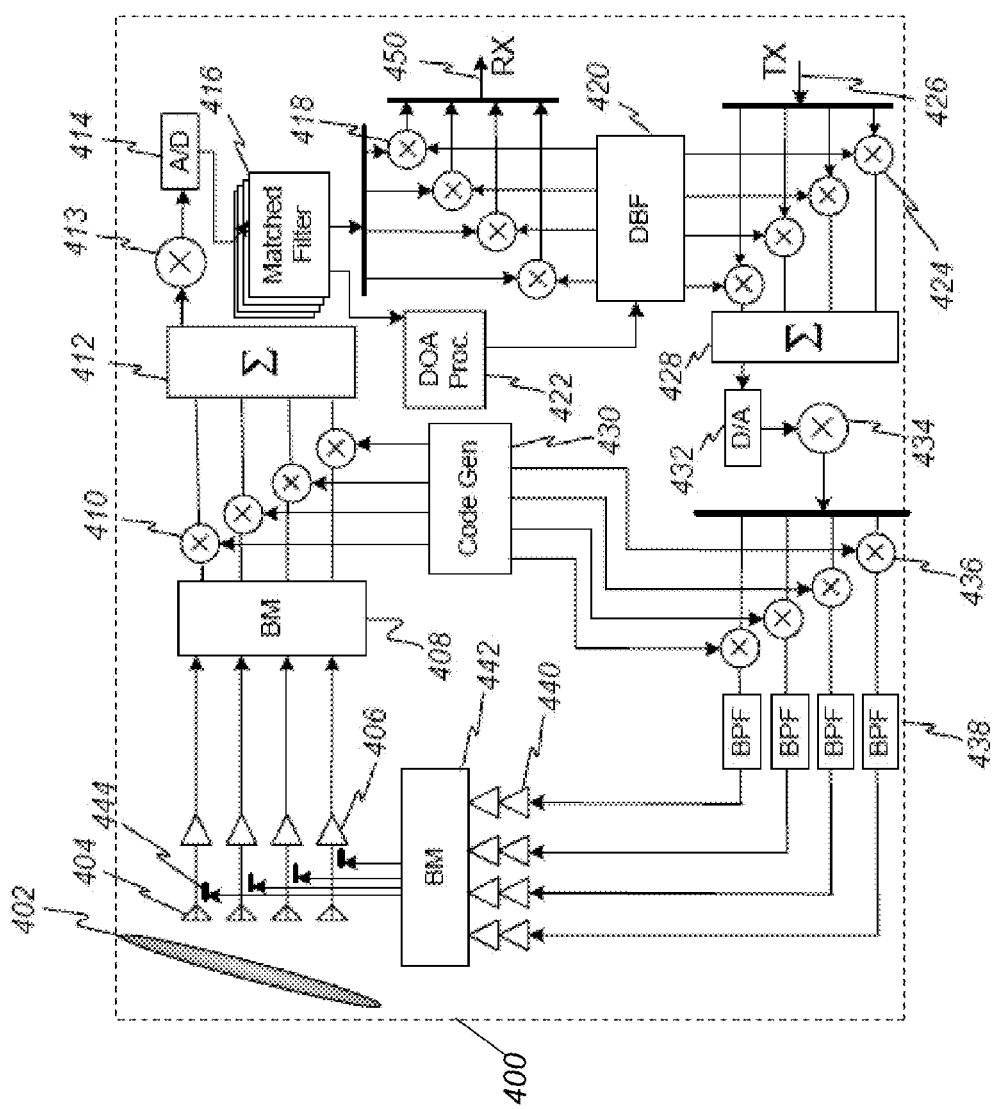
FIG. 4A illustrates a block diagram of an alternative embodiment of a multiple-beam retro-directive ground terminal in accordance with the present invention.

FIG. 4A illustrates an alternative embodiment of retro-directive terminal in accordance with the present invention. This embodiment takes advantage of high-speed digital electronics to simplify the radio-frequency processing. Signals impinging on a parabolic reflector 402 are focused onto an array feed 404. The detected power from each feed element 404 is routed through a low-noise amplifier 406 and sent to a four-input BM 408. It should be appreciated that systems with more or fewer array feed elements and corresponding BM inputs and outputs would also fall within the scope and spirit of the present invention. Each output of the BM 408 is then bi-phase modulated 410 by a pseudonoise (PN) code sequence generated by a code generator 430. Each output of the code generator 430 is used to modulate a corresponding one of the outputs of the BM 408, and the PN code sequences are mutually orthogonal. The modulated outputs of the BM are then summed together 412, and the composite RF signal is frequency down-converted 413 and then digitized using an analog-to-digital converter 414. As compared to the embodiment described with reference to FIG. 2A, above, four individual down-conversion devices (e.g, 216) are consolidated into a single down-converter 413, which allows for better channel matching and simplification of the radio-frequency portion of the circuit, assuming the processing power of the digital circuit is adequate. Also eliminated from the embodiment of FIG. 2 is a separate analog receive path including a switch matrix 206 and an independent frequency down-converter 208 for producing the main receive signal channel. As the speed of digital processing hardware increases and the cost decreases, systems will tend to move further toward the digital architecture depicted in FIG. 4A.

The digitized samples from the A/D 414 are then passed through a set of matched filters that correlate the samples with each of the orthogonal codes applied to the outputs of the receive BM 408. Because of the mutual orthogonality of the PN code sequences, digital samples corresponding to the four outputs of the BM are recovered. A direction-of-arrival (DOA) processor 422 analyzes the four digitized outputs of the BM 408 and calculates a phase slope that enables calculation of the direction of arrival of the input radio-frequency beam. A set of beam weight vectors (BWVs) are calculated by a digital beam forming (DBF) processor 420 to correspond to this direction of arrival. These directional weights are then applied 418 to the outputs of the matched filter 416 to produce the digital receive signal 450 that is sent off to the main system receiver.

The main digital transmit signal 426 of the system is also multiplied 424 by a corresponding set of BWVs calculated by the DBF processor 420 to produce a phase slope that is conjugate to the phase slope of the received beam. The transmit signals, mixed with appropriate BWVs are then digitally summed 428, and a baseband waveform is synthesized using a digital-to-analog (D/A) converter 432. The baseband waveform is frequency up-converted 434 to radio frequency and is then modulated 436 by the same set of four orthogonal PN codes 430 to produce four component signals that are then filtered by band-pass filters 438, amplified 440 and applied to the inputs of a transmit-side BM 442. The outputs of the transmit-side BM 442 then drive the array feed elements 404 through diplexers 444. The proper choice of BWVs applied to the transmit signal produces inputs to the BM that are then combined in such a way that, in general, only one output of the BM is non zero.

Of course, as described with reference to the embodiment pictured in FIG. 2A, it is also possible to group antenna feed elements to improve the scan resolution, and in that case, more than one of the outputs of the transmit-side BM 442 could be non zero. The matching of the phase slopes achieved by the DOA processor 422 and the DBF processor 420 thus enables the system transmit signals to be retro-directed with respect to the received signals.

It should be appreciated that the systems described with reference to FIGS. 2A and 4A do not require a continuous receive signal in order to determine how to point the transmit beam. Both systems can save the direction-of-arrival information calculated by the DOA processor, e.g., 422, and use it to apply appropriate BWVs at a later time to the transmit data stream.

Figure 4B:
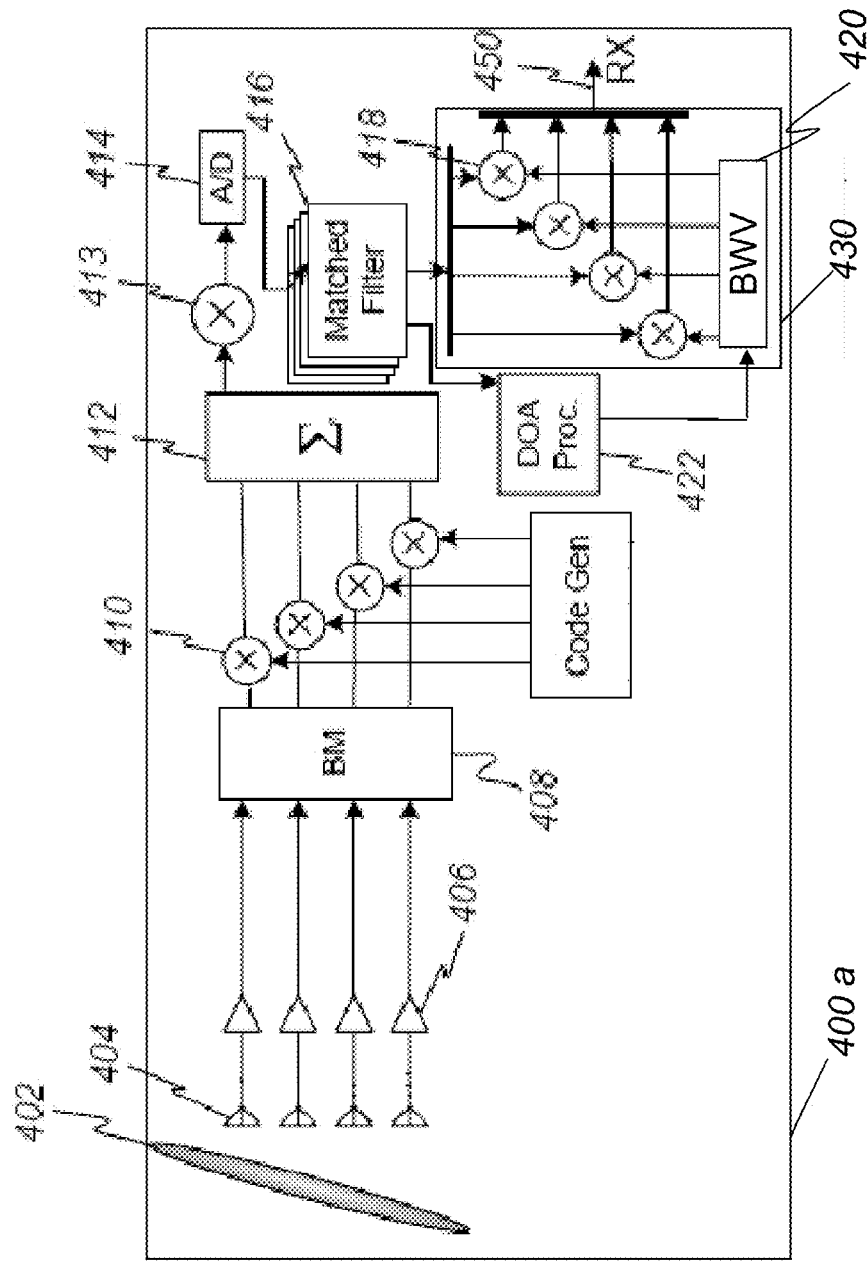
FIG. 4B illustrates a block diagram of an alternative embodiment of a Rx only smart ground terminal in accordance with the present invention.

FIG. 4B depicts the same block diagram of an Rx portion of the embodiment of a ground terminal in FIG. 4 in accordance with the present invention. The DOA processor 422 will calculate the pointing directions toward a desired satellite in an inclined orbit in terms of local azimuth and elevation, or equivalent. The information is captured as the updated BWV buffer 420 in a Rx DBF processor 430.

Figure 4C:
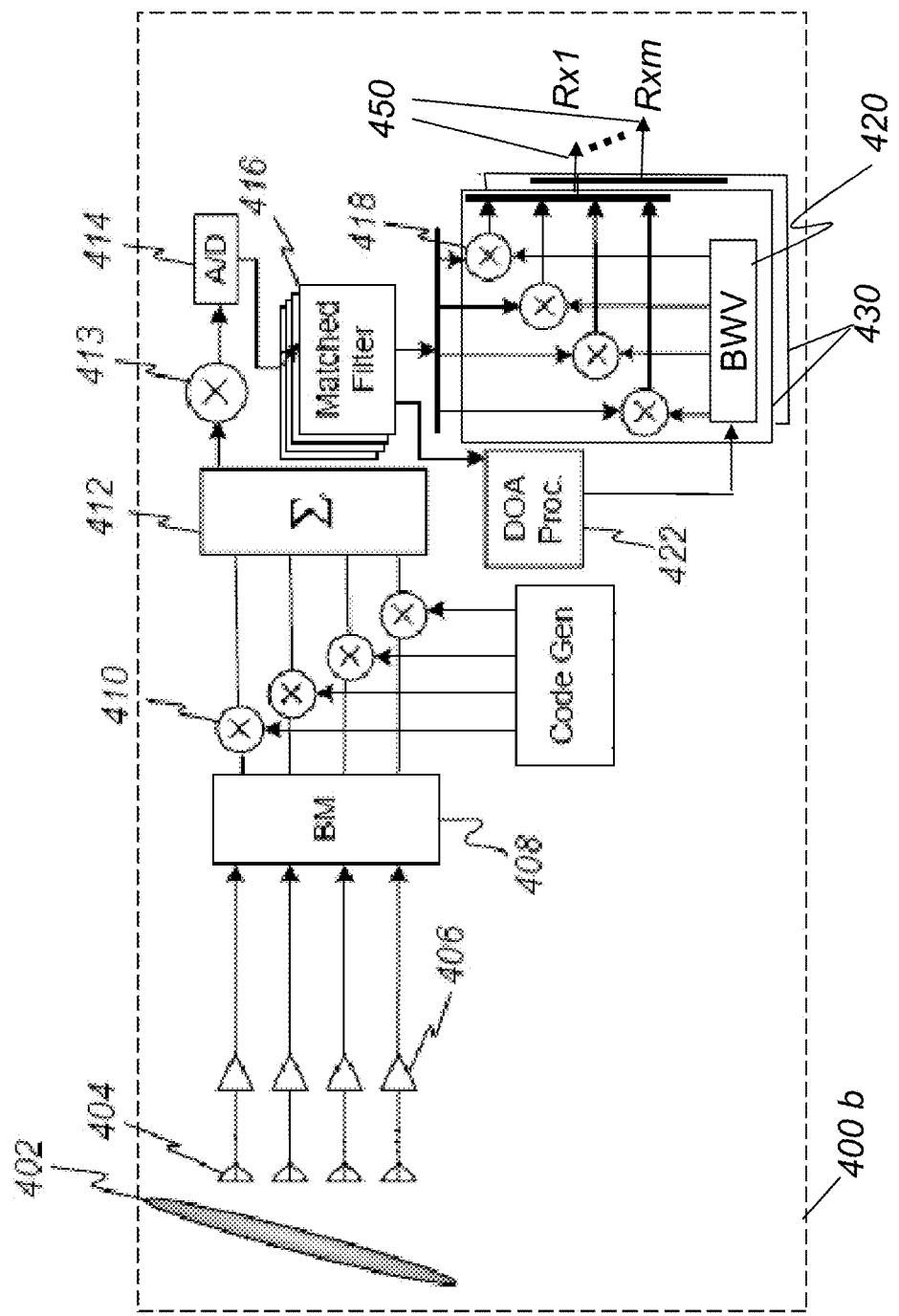
FIG. 4C illustrates a block diagram of an embodiment of a multiple-beam Rx only smart ground terminal in accordance with the present invention.

FIG. 4C depicts the same block diagram of the embodiment of a ground terminal in FIG. 4B, except forming multiple beams concurrently pointed to different satellites in accordance with the present invention. The DOA processor 422 will calculate the pointing directions toward desired satellites in inclined orbits in terms of local azimuth and elevation, or equivalent. The information for a given satellite is captured as the updated BWV buffer 420 in a Rx DBF processor 430.

Figure 4D:
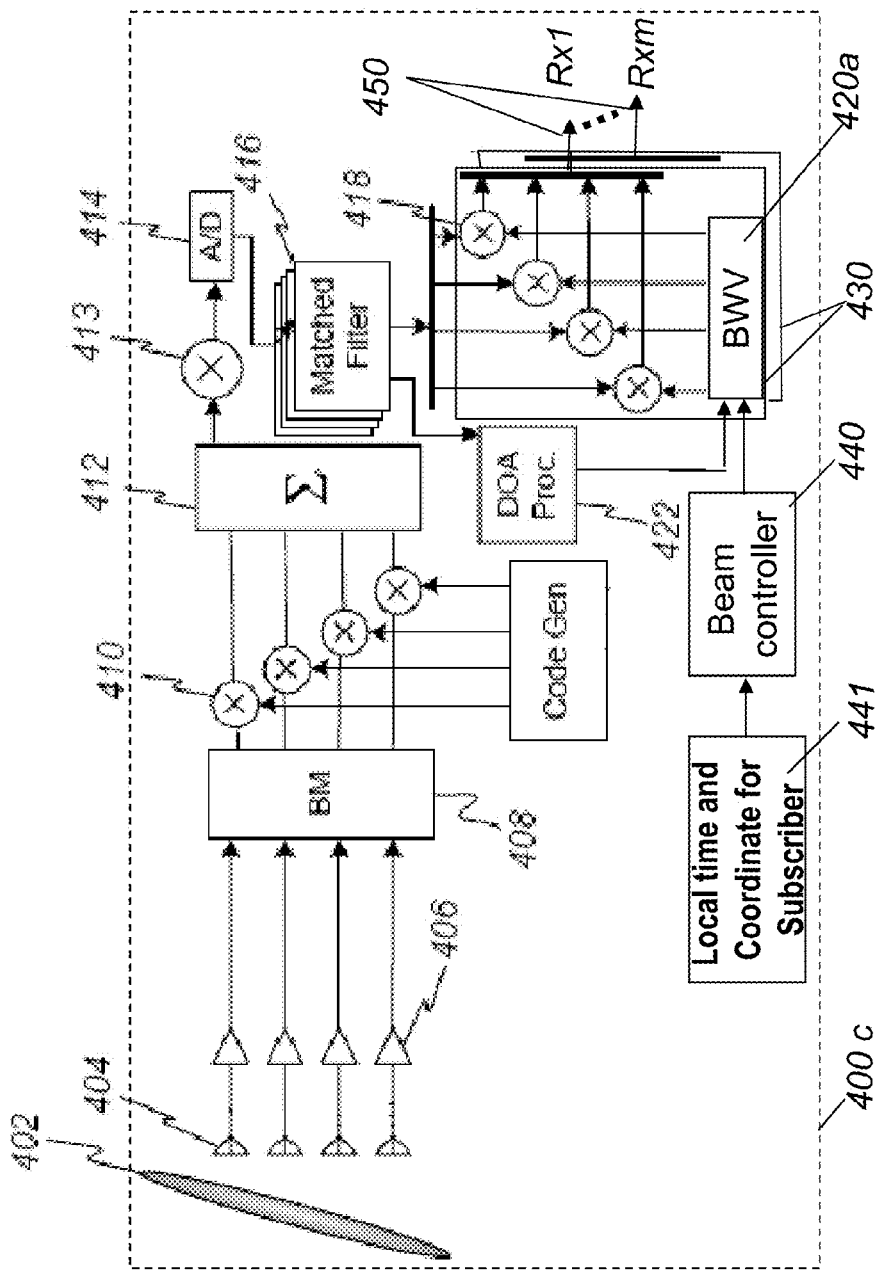
FIG. 4D illustrates a block diagram of an alternative embodiment of a multiple-beam Rx only smart ground terminal with a command pointing option in accordance with the present invention.

FIG. 4D depicts the same block diagram of the embodiment of a ground terminal in FIG. 4C, except command inputs from an external beam controller 440 to identify the beam positions and associated nulls for multiple beams concurrently pointed to different satellites in accordance with the present invention. The command pointing is depicted in the 440 and 441 blocks based on (1) where the terminal is located and how it is oriented, and (2) time of the date to derive satellite positions in inclined orbits. The external beam controller 440 calculates the pointing directions toward desired satellites and nulls against undesired satellites in inclined orbits in terms of local azimuth and elevation, or equivalent. The information for a beam position and associated nulls is captured by the updated BWV stored in a buffer 420 in a Rx DBF processor 430.

Figure 5B:
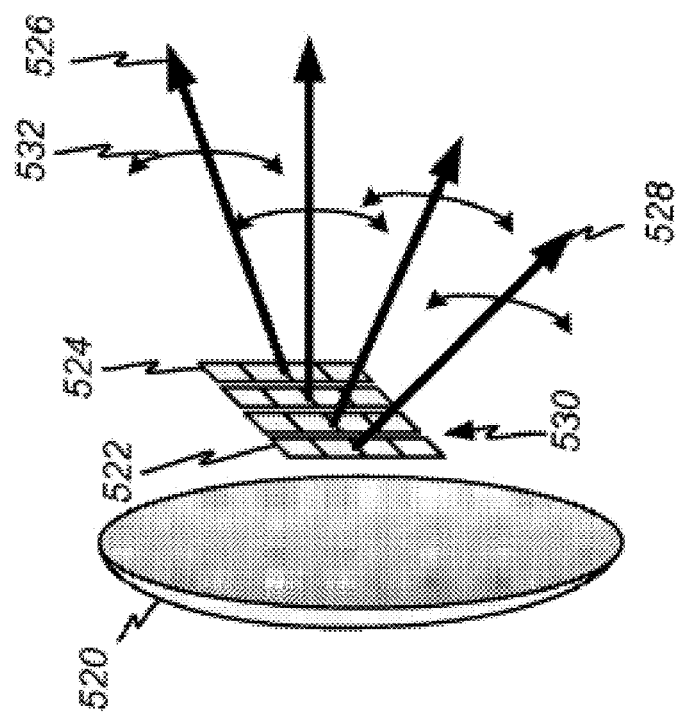
FIGS. 5A and 5B are schematic drawings of two embodiments of antennas in accordance with the present invention showing single and multiple satellite-tracking capability.
Figure 5A:
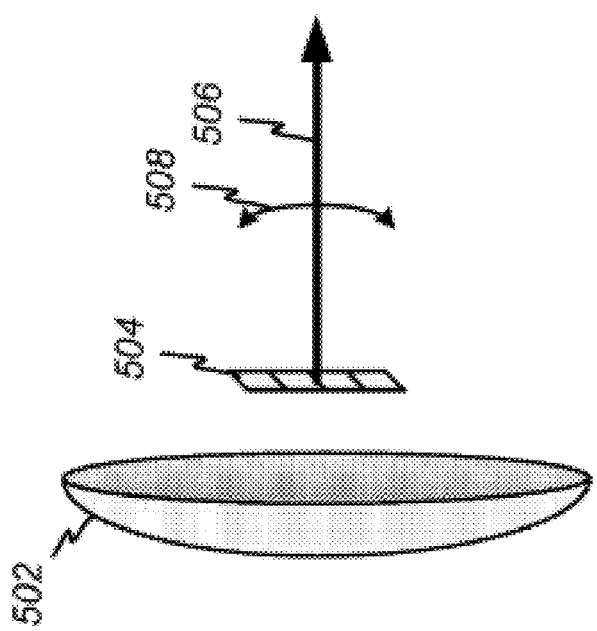

FIG. 5A depicts a schematic view of an embodiment of a parabolic antenna in accordance with the present invention. The reflector 502 has a paraboloid surface and is illuminated by a linear feed array 504 comprising four feed element aligned in the local elevation (north-south) direction. The beam from the satellite is indicated schematically at 506. By switching the transmit drive signal to various elements of the feed 504 as described previously, the beam can be made to scan in the elevation direction as indicated at 508.

In another embodiment in accordance with the present invention and illustrated in FIG. 5B, the reflector has a parabolic-toroidal surface that is parabolic in the elevation direction and circular in the azimuth direction. The feed 530 of this embodiment comprises four independent four-element linear arrays, e.g., 522 and 524. Each of the four-element arrays is positioned in the focal plane along a line in the azimuth direction. The beams created by each of the four four-element feed arrays are shown schematically, e.g., 526 and 528. The displacement of each feed array along the azimuth direction creates a beam that is deflected in azimuth from the boresight of the antenna 520. Each individual beam can also be scanned in the elevation dimension, e.g., 532, by controlling which element of the linear array 524 is driven. Thus, such a system effectively combines four elevation tracking stations into a single aperture and could be used to track four independent geostationary satellites in slightly inclined orbits as long as they were not spaced too far apart in azimuth.

FIGS. 6A and 6B illustrate the improved azimuthal scanning performance of a parabolic-toroidal antenna over a parabolic antenna. FIG. 6A depicts azimuth cuts of the antenna pattern of a parabolic antenna. Degrees off of boresight are plotted along the horizontal axis 608, and the relative pattern intensity in dBi is plotted along the vertical axis 606. Individual azimuth cuts, e.g., 604, are plotted as a function of boresight angle. The depiction illustrates that the pattern of a parabolic antenna falls off by 5 dB at a scan angle of 25 degrees.

Toroidal reflectors feature better scanning characteristics in Azimuth direction. It is possible to design toroidal reflectors with Azimuthal scanning ranges of ±10 to ±15 beamwidths; significant improvement to conventional parabolic reflectors.

FIG. 6B illustrates the same azimuth cuts for a parabolic-toroidal antenna with a circular shape in the azimuth dimension. The pattern cuts, e.g., 612, are plotted as a function of boresight angle 616. As is evident from the FIG. 6B, the amplitude falls off by only about 1 dB at scan angles of 25 degrees, illustrating the improved scanning performance of the toroidal reflector.

Thus, a retro-directive antenna is achieved that takes advantage of the limited field-of-view presented by a parabolic reflector fed by an array feed. Each feed element of the retro-directive antenna is associated with a unique elevation pointing direction of the beam in the far field. As the transmit energy is switched to different feed elements, the far-field beam is scanned in elevation, making it possible to track a geostationary satellite in a slightly inclined orbit. The retro-directive antenna is able to autonomously detect the elevation direction from which a signal is received, and a direction-of-arrival processor and a digital beam-forming processor are used to prepare a transmit beam that points back along the same direction. This eliminates the need for mechanical tracking and maintains high antenna gain in the direction of the geostationary satellite.

A similar technique is applied in parallel in the azimuth direction to create a multi-beam retro-directive antenna that can track multiple geostationary satellites simultaneously and independently. A parabolic-toroidal reflector is preferentially coupled to an array feed comprising multiple linear arrays, each of which is capable of supporting tracking in the elevation direction. The displacement of the multiple linear arrays in the azimuth direction creates independent simultaneous beams that point in different azimuth directions, each capable of independently tracking motion in the elevation direction. Those skilled in the art will likely recognize further advantages of the present invention, and it should be appreciated that various modifications, adaptations, and alternative embodiments thereof may be made within the scope and spirit of the present invention. The invention is further defined by the following claims.

What is claims is:

1. A method for communication, comprising:
   providing an antenna system including a reflector having a focus and a feed array positioned at or near the focus and having N feed elements;
   receiving N feed signals via the N feed elements, the N feed signals resulting from illumination of the N feed elements by a target signal incident on the reflector from a slow-moving signal source;
   inputting the N feed signals to an N-to-N Fourier Transform device;
   performing a spatial Fourier Transform on the N feed signals to generate N output signals, via the N-to-N Fourier Transform device;
   computing a phase slope across the N output signals, via a correlation processor coupled to the N-to-N Fourier Transform device; and
   determining a direction of arrival of the target signal based on the phase slope, via a direction-of-arrival processor coupled to the correlation processor.

2. The method of claim 1 further comprising:
   generating a beam weight vector for a beam associated with the direction of arrival; and
   applying the beam weight vector to the N output signals to generate a receive beam, via a digital beam forming processor.

3. The method of claim 1, wherein providing the antenna system comprises positioning the N feed elements linearly in a focal plane of the reflector or slightly away from the focus of the reflector.

4. The method of claim 1, wherein providing the antenna system comprises positioning the N feed elements as a plurality of linear arrays in a focal plane of the reflector or slightly away from the focus of the reflector.

5. The method of claim 1, wherein providing an antenna system comprises providing the reflector with a parabolic surface or a parabolic-toroidal surface.

6. The method of claim 1 further comprising determining a first feed element of the N feed elements based on the direction of arrival, via the direction-of-arrival processor.

7. The method of claim 6 further comprising selecting a first feed signal of the N feed signals as a receive target signal, the first feed signal being associated with the first feed element, via a switch matrix coupled to the direction-of-arrival processor and the N feed elements.

8. A method for communication, comprising:
providing an antenna system including a reflector having a focus and a feed array positioned at or near the focus and having N feed elements;
receiving N feed signals via the N feed elements, the N feed signals resulting from illumination of the N feed elements by a set of target signals incident on the reflector from respective slow-moving signal sources;
inputting the N feed signals to an N-to-N Fourier Transform device;
performing a spatial Fourier Transform on the N feed signals to generate N output signals, via the N-to-N Fourier Transform device;
computing cross-correlations from the N output signals to generate a vector modifier, via a correlation processor coupled to the N-to-N Fourier Transform device;
computing a phase slope across the N output signals for each of the target signals, via the correlation processor;
determining directions of arrival of the respective target signals based on the respective phase slopes, via a direction-of-arrival processor coupled to the correlation processor; and
generating, based on the vector modifier and the directions of arrival, beam weight vectors for respective beams associated with the respective directions of arrival, via the direction-of-arrival processor.

9. The method of claim 8 further comprising:
applying, via each of digital beam forming processors, a respective one of the beam weight vectors to the N output signals to generate a respective receive beam; and
outputting concurrently the respective beams from the respective digital beam forming processors as respective received signals from the slow-moving signal sources.

10. The method of claim 8, wherein providing the antenna system comprises positioning the N feed elements linearly in a focal plane of the reflector or slightly away from the focus of the reflector.

11. The method of claim 8, wherein providing the antenna system comprises positioning the N feed elements as a plurality of linear arrays in a focal plane of the reflector or slightly away from the focus of the reflector.

12. The method of claim 8, wherein providing an antenna system comprises providing the reflector with a parabolic surface or a parabolic-toroidal surface.

13. The method of claim 8 further comprising:
inputting time of day and coordinates of a terminal that includes the antenna system to a beam controller;
computing second beam weight vectors for a plurality of beam positions and associated null positions based on the time of day and the coordinates of the terminal, via the beam controller;
inputting the second beam weight vectors to the direction-of-arrival processor; and
generating modified beam weight vectors based on the second beam weight vectors and the vector modifier, via the direction-of-arrival processor.

14. The method of claim 8, wherein the N-to-N Fourier Transform device includes a Butler Matrix.

15. A method for communication, comprising:
providing an antenna system including a reflector having a focus and a feed array positioned at or near the focus and having N feed elements;
receiving N feed signals via the N feed elements, the N feed signals resulting from illumination of the N feed elements by a target signal incident on the reflector from a slow-moving signal source;
inputting the N feed signals to a first N-to-N Fourier Transform device;
performing a spatial Fourier Transform on the N feed signals to generate N output signals, via the first N-to-N Fourier Transform device;
computing a phase slope across the N output signals, via a correlation processor coupled to the first N-to-N Fourier Transform device; and
determining a direction of arrival of the target signal based on the phase slope, via a direction-of-arrival processor coupled to the correlation processor;
generating a beam weight vector for a transmit beam associated with the direction of arrival; and
applying the beam weight vector to a transmit signal to generate N element signals, via a digital beam forming processor.

16. The method of claim 15 further comprising:
converting the N element signals from digital signals to analog signals via N digital-to-analog converters;
frequency up-converting the N analog element signals; and
amplifying the N up-converted analog element signals.

17. The method of claim 16 further comprising:
inputting the N amplified up-converted analog element signals to a second N-to-N Fourier Transform device;
performing a second spatial Fourier Transform on the N amplified up-converted analog element signals to generate N output transmit signals, via the second N-to-N Fourier Transform device; and
applying the N output transmit signals to the N feed elements via diplexers.

18. The method of claim 15, wherein the first and second Fourier Transform devices are respectively first and second Butler Matrices.

19. The method of claim 15, wherein providing an antenna system comprises providing the reflector with a parabolic surface or a parabolic-toroidal surface.

20. The method of claim 15, wherein providing the antenna system comprises positioning the N feed elements linearly in a focal plane of the reflector or slightly away from the focus of the reflector.

* * * * *